United States Patent
Otoguro

(10) Patent No.: US 10,882,557 B2
(45) Date of Patent: Jan. 5, 2021

(54) VEHICLE LOWER STRUCTURE

(71) Applicant: TOYOTA JIDOSHA KABUSHIKI KAISHA, Aichi-ken (JP)

(72) Inventor: Kazuma Otoguro, Toyota (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 121 days.

(21) Appl. No.: 16/294,842

(22) Filed: Mar. 6, 2019

(65) Prior Publication Data
US 2019/0276080 A1 Sep. 12, 2019

(30) Foreign Application Priority Data
Mar. 9, 2018 (JP) .................... 2018-042753

(51) Int. Cl.
| | | |
|---|---|---|
| *B60J 7/00* | (2006.01) | |
| *B62D 21/03* | (2006.01) | |
| *B60K 1/04* | (2019.01) | |
| *B62D 25/20* | (2006.01) | |

(52) U.S. Cl.
CPC .............. *B62D 21/03* (2013.01); *B60K 1/04* (2013.01); *B62D 25/20* (2013.01); *B60K 2001/0438* (2013.01)

(58) Field of Classification Search
CPC .......... A47B 47/00; A47C 4/03; A47F 5/103; A63B 2210/50; A63C 9/0805; B29C 45/1704; B60R 1/087; B65H 2513/41; F04C 18/3446; H01L 21/67326
See application file for complete search history.

(56) References Cited

U.S. PATENT DOCUMENTS

| | | | | |
|---|---|---|---|---|
| 7,097,235 | B2* | 8/2006 | Yasukouchi ......... | B62D 21/152 296/187.03 |
| 8,231,166 | B2* | 7/2012 | Mori .................... | B62D 21/152 280/784 |
| 9,156,504 | B2* | 10/2015 | Terada ................. | B62D 25/087 |
| 10,112,470 | B2* | 10/2018 | Hamilton .............. | B60N 2/015 |
| 10,207,740 | B2* | 2/2019 | Yamada ............... | B62D 25/087 |
| 10,392,052 | B2* | 8/2019 | Takahashi ............. | B62D 25/20 |
| 10,494,035 | B2* | 12/2019 | Abe ...................... | B62D 25/025 |
| 2001/0028179 | A1* | 10/2001 | Takemoto ............ | B62D 21/157 296/204 |
| 2004/0183340 | A1* | 9/2004 | Tomita ............... | B62D 25/2018 296/204 |

(Continued)

FOREIGN PATENT DOCUMENTS

JP 2015-615 A 1/2015

*Primary Examiner* — Kiran B Patel
(74) *Attorney, Agent, or Firm* — Hauptman Ham, LLP

(57) ABSTRACT

A vehicle lower structure includes: a pair of rear side members having a kick-up part bent toward an upper rear side of a vehicle; a rear cross member that connect parts of the pair of rear side members on a rear side from the kick-up parts; a battery pack; and a bracket including a lower flange placed against a rear end of the battery pack, and has a lower fastening hole through which a first fastening member is inserted; and an upper flange that is placed against the rear cross member, and has an upper fastening hole through which a second fastening member is inserted. The bracket has a fragile portion at least either between the upper fastening hole and an end edge of the upper flange or between the lower fastening hole and an end edge of the lower flange.

4 Claims, 15 Drawing Sheets

(56) References Cited

U.S. PATENT DOCUMENTS

| | | | |
|---|---|---|---|
| 2010/0101885 A1* | 4/2010 | Nozaki | B62D 21/155 |
| | | | 180/232 |
| 2013/0319780 A1* | 12/2013 | Nitawaki | B60K 1/04 |
| | | | 180/68.5 |
| 2014/0291046 A1* | 10/2014 | Araki | B62D 25/2036 |
| | | | 180/68.5 |
| 2014/0302362 A1* | 10/2014 | Takizawa | H01M 2/1077 |
| | | | 429/83 |
| 2017/0106916 A1* | 4/2017 | Ajisaka | B60K 15/073 |
| 2017/0174064 A1* | 6/2017 | Shinoda | B62D 29/008 |
| 2017/0368924 A1* | 12/2017 | Jeong | B60K 1/04 |
| 2018/0126857 A1* | 5/2018 | Kelly-Morgan | B60L 58/40 |
| 2018/0127032 A1* | 5/2018 | Atsumi | B62D 21/15 |
| 2018/0166756 A1* | 6/2018 | Inoue | H01M 2/20 |
| 2019/0275875 A1* | 9/2019 | Fukui | B62D 25/20 |
| 2019/0275876 A1* | 9/2019 | Fukui | B62D 21/09 |
| 2019/0276081 A1* | 9/2019 | Otoguro | B62D 25/20 |
| 2019/0312320 A1* | 10/2019 | Uchiyama | H01M 10/613 |
| 2020/0001928 A1* | 1/2020 | Ota | B60G 9/04 |
| 2020/0031214 A1* | 1/2020 | Matsuo | B62D 25/20 |
| 2020/0062318 A1* | 2/2020 | Otoguro | B60L 3/0007 |
| 2020/0067108 A1* | 2/2020 | Yoshitomi | H01M 8/04559 |

\* cited by examiner

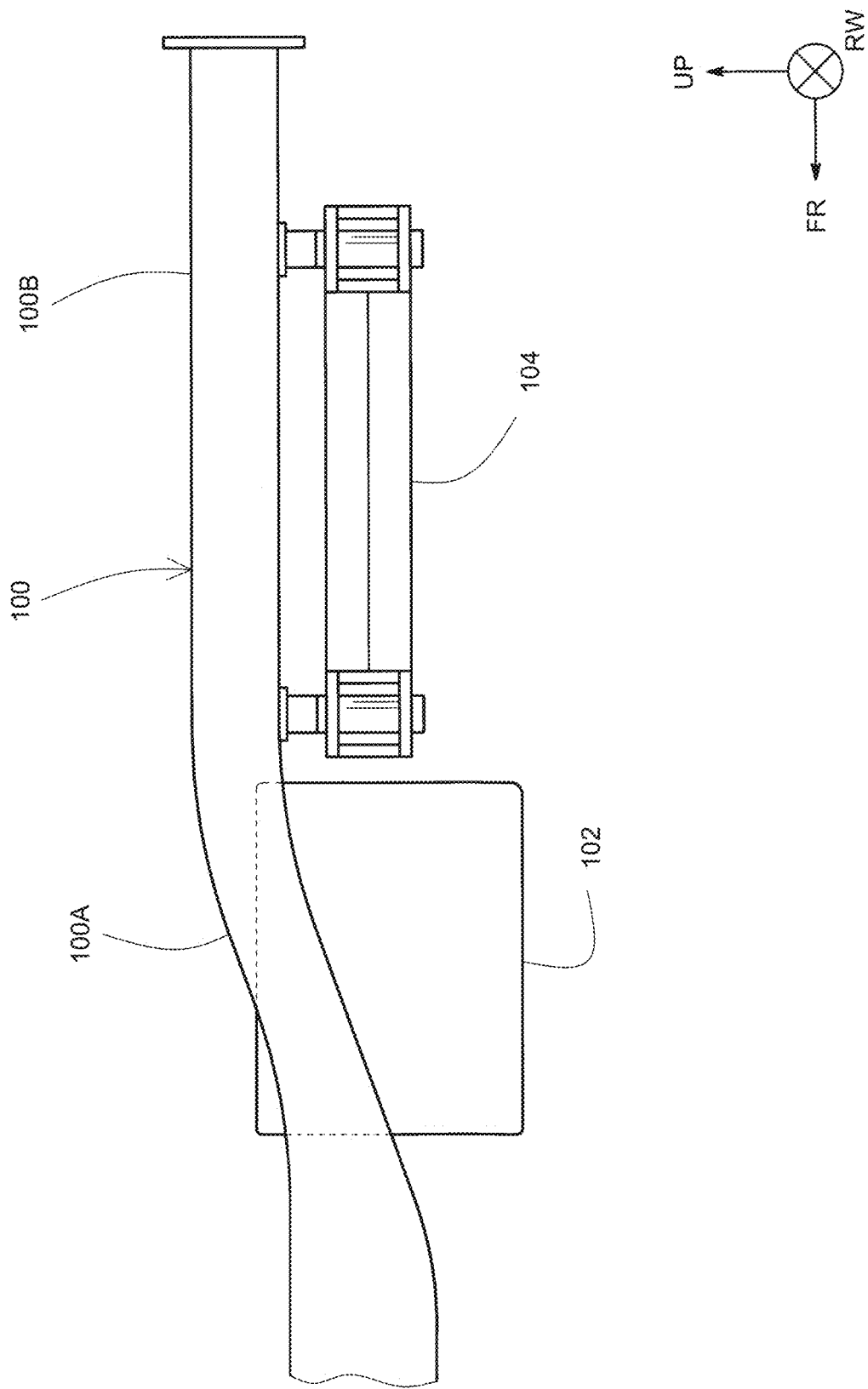

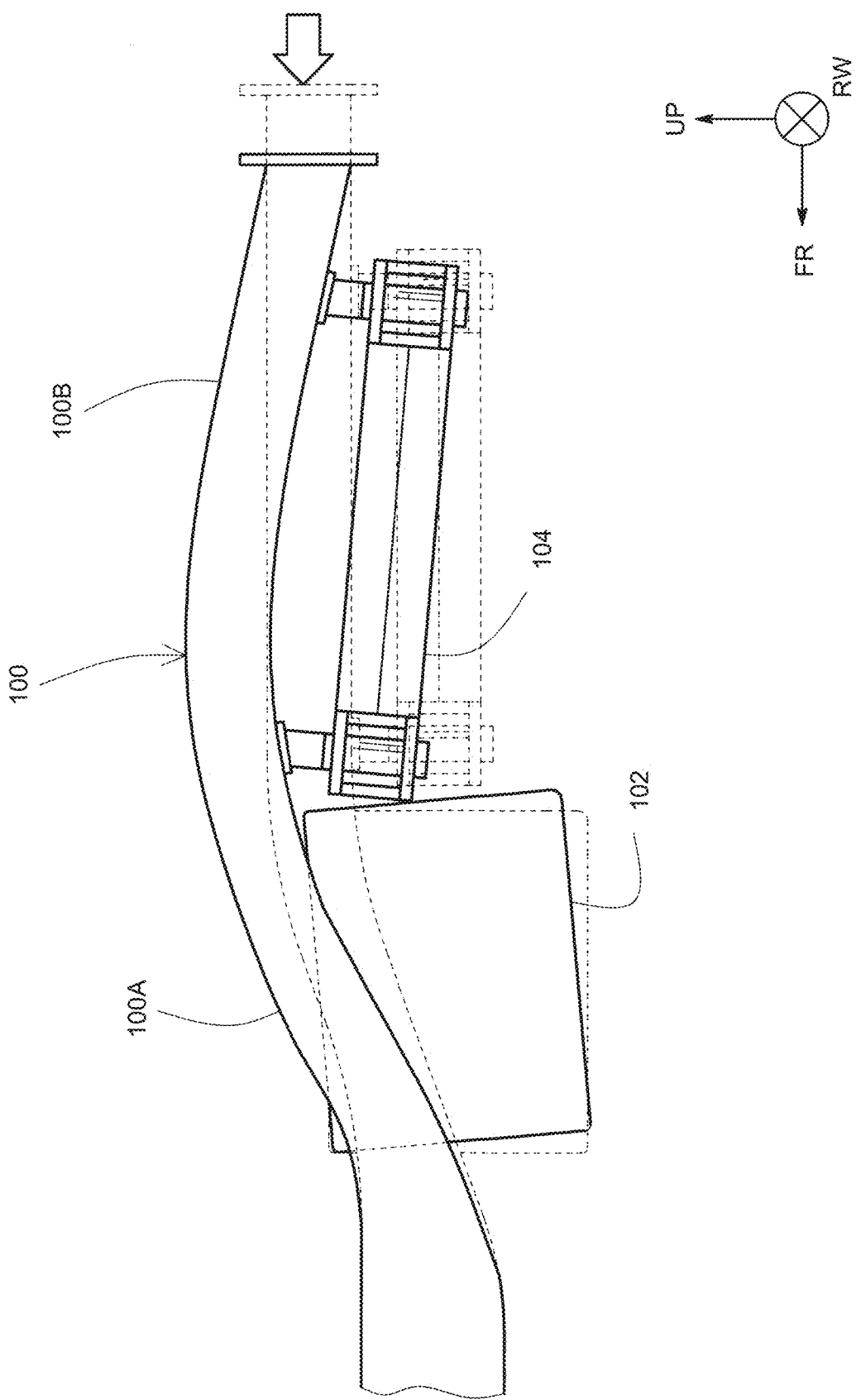

VEHICLE LOWER STRUCTURE

INCORPORATION BY REFERENCE

The disclosure of Japanese Patent Application No. 2018-042753 filed on Mar. 9, 2018 including the specification, drawings and abstract is incorporated herein by reference in its entirety.

BACKGROUND

1. Technical Field

The present disclosure relates to a vehicle lower structure.

2. Description of Related Art

A vehicle using a rotating electric machine as a driving source, such as an electric vehicle, is equipped with a battery as a power source. For example, in Japanese Patent Application Publication No. 2015-615, a battery case is disposed on a rear side of a vehicle.

Specifically, in a luggage space on the rear side of the vehicle, a pair of rear side members that is framework members extends in a vehicle length direction, one on each side in a vehicle width direction. The battery case is disposed and fixed between the pair of rear side members.

As illustrated in FIG. 14, each rear side member 100 may include a kick-up part 100A that extends from a rear end of a vehicle cabin toward the luggage space while bending toward an upper rear side so as to draw a curve, and a linear part 100B that is connected to a rear end of the kick-up part 100A and extends in the vehicle length direction (FR-axis direction). A battery case 102 may be fixed to the linear part 100B.

SUMMARY

In the event of a rear-end collision (hereinafter written as a rear-end collision as appropriate) of the vehicle, a plurality of members that is supported by and fixed to those parts of the rear side members that are on the rear side from the kick-up parts may collide with one another. As illustrated in FIG. 15, during a rear-end collision, a frontward collision load is input into rear ends of the rear side members 100. In this case, due to the upward-bending shape of the kick-up parts 100A, the kick-up parts 100A are warped such that the bending shape is squeezed and projects further upward.

Meanwhile, the battery case 102 and a rear suspension member 104 that are hung from and supported by the rear side members 100 and provided one behind the other along the vehicle length direction, are pulled upward as the rear side members 100 deform. As the rear side members 100 are further bent, the battery case 102 and the rear suspension member 104 may come closer to each other and eventually into contact with each other.

The present disclosure provides a vehicle lower structure that can prevent a battery hung from and supported by rear side members from coming into contact with another component during a rear-end collision.

An aspect of the disclosure provides a vehicle lower structure including: a pair of front side members provided one on each side of a floor in a vehicle width direction and extending in a vehicle length direction; a pair of rear side members, each of the rear side members being connected at a front end of the rear side member to a rear end of corresponding one of the pair of front side members and having a kick-up part bent toward an upper rear side of a vehicle; a rear cross member that extends in the vehicle width direction so as to connect a part of one of the pair of rear side members on a rear side from a kick-up part of the one of the pair of rear side members and a part of the other one of the pair of rear side members on a rear side from a kick-up part of the other one of the pair of rear side members; a battery pack that is installed under the floor, is hung from the pair of front side members and is hung from the pair of the rear side members through the rear cross member; and a bracket including a lower flange that is placed against a rear end of the battery pack, and has a lower fastening hole through which a first fastening member to be fastened to the rear end of the battery pack is inserted and an upper flange that is placed against the rear cross member, and has an upper fastening hole through which a second fastening member to be fastened to the rear cross member is inserted. The bracket has a fragile portion at least either between the upper fastening hole and an end edge of the upper flange or between the lower fastening hole and an end edge of the lower flange.

According to this configuration, a tensile load in an up-down direction is input into the bracket when the rear side members are bent upward during a rear-end collision. At least one of the upper flange and the lower flange of the bracket is provided with the fragile portion, and when the tensile load is input, this fragile portion fractures and exposes the fastening hole, causing the battery pack to be detached from the rear cross member and the rear side embers. As a result, the battery pack detached from the rear side members and another component that is hung from and supported by the rear side members and is pulled up as the rear side members are bent, are located at different positions from each other in the up-down direction. Thus, the battery pack and the component can pass each other in the vehicle length direction and contact therebetween can be prevented.

In the above aspect, the fragile portion of the lower flange may be provided on a lower side from the lower fastening hole.

According to this configuration, the fragile portion is formed on a path along which a stress (tensile stress) is generated in response to a tensile load input into the bracket. Thus, the fragile portion fractures quickly during a rear-end collision (when a tensile load is input).

In the above aspect, the battery pack may be hung from the part of one of the pair of rear side members on the rear side from the kick-up part of the one of the pair of rear side members and the part of the other one of the pair of rear side members on the rear side from the kick-up part of the other one of the pair of rear side members, by only the bracket.

According to this configuration, simply causing the bracket to fracture during a rear-end collision can prevent the battery pack from being pulled up by the rear side members.

In the above aspect, the fragile portion may have a lower load-bearing property than parts of the bracket other than the fragile portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 14 is a side view illustrating a vehicle lower structure according to a comparative example; and FIG. 15 is a side view describing the behavior of the vehicle lower structure according to the comparative example during a rear-end collision of the vehicle.

DETAILED DESCRIPTION OF EMBODIMENTS

A vehicle lower structure according to an embodiment will be described with reference to FIG. 1 to FIG. 13. In FIG. 1 to FIG. 13, a vehicle front-rear direction (hereinafter written as a vehicle length direction as appropriate) is indicated by an axis denoted by reference sign FR; a vehicle width direction (hereinafter written as a vehicle width direction as appropriate) is indicated by an axis denoted by reference sign RW; and a vertical direction (hereinafter written as a vehicle height direction as appropriate) is indicated by an axis denoted by reference sign UP. Reference sign FR is short for front, and a direction toward a vehicle front side is a positive direction along the vehicle length-direction axis FR. Reference sign RW is short for right width, and a direction toward a right side in the vehicle width direction is a positive direction along the vehicle width-direction axis RW. A direction toward an upper side is a positive direction along the vehicle height-direction axis UP.

Figure 1:
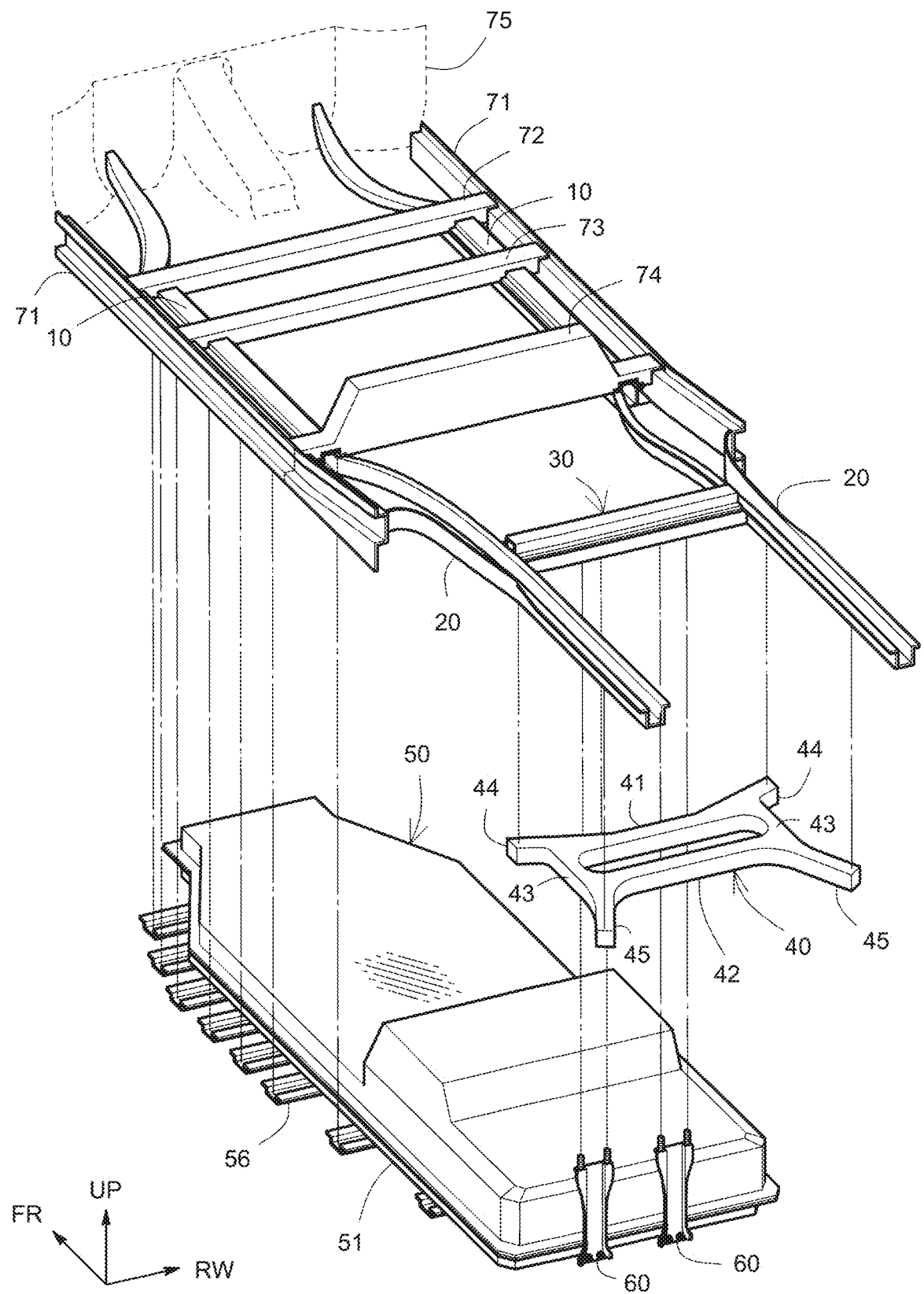
FIG. 1 is an exploded perspective view illustrating a vehicle lower structure according to an embodiment.
Figure 2:
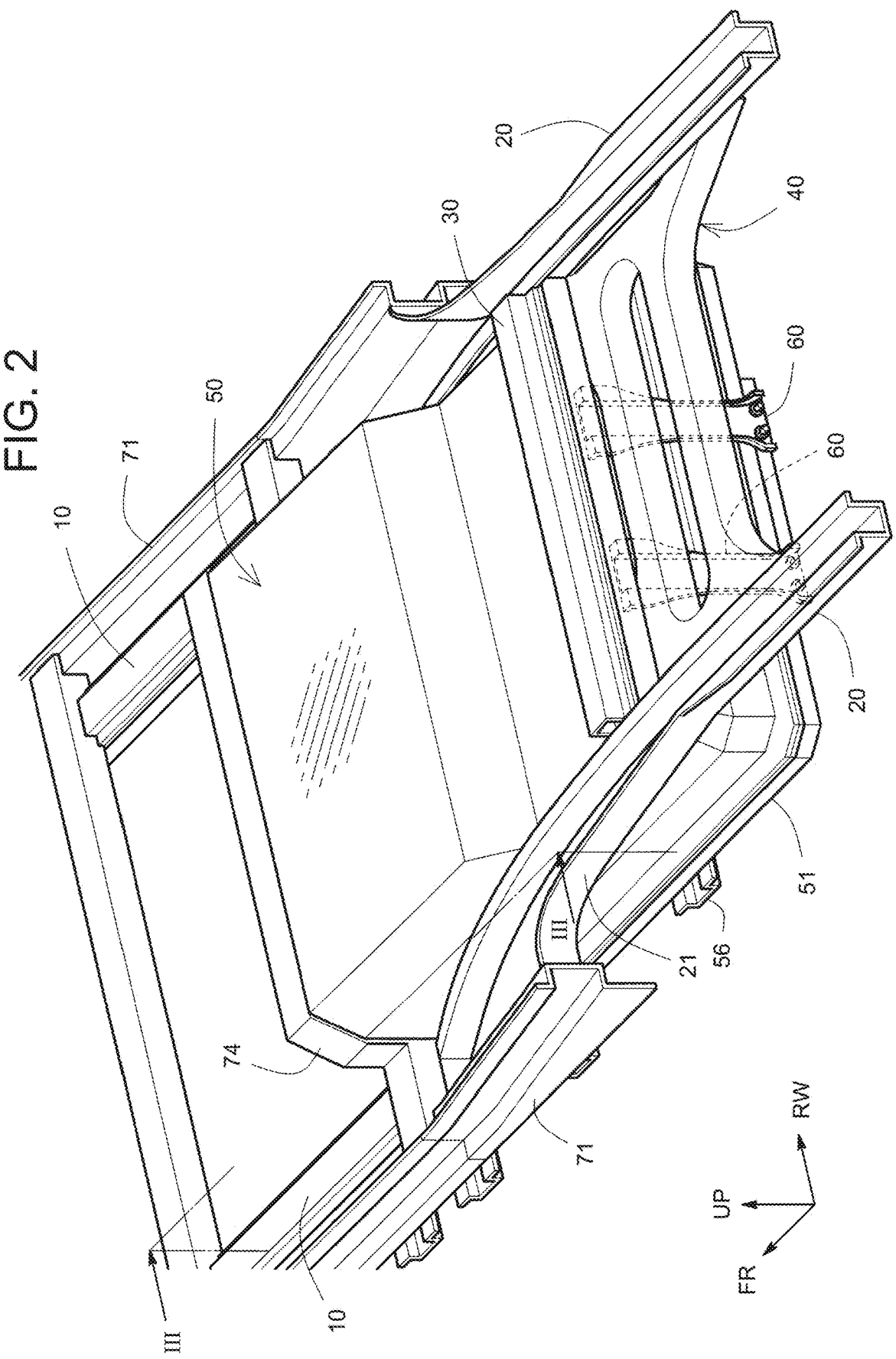
FIG. 2 is an assembled perspective view illustrating the vehicle lower structure according to the embodiment.

FIG. 1 illustrates an exploded perspective view of the vehicle lower structure according to the embodiment. FIG. 2 illustrates an assembled perspective view of the vehicle lower structure according to the embodiment. The vehicle lower structure according to the embodiment is installed, for example, in an electric vehicle.

Referring to FIG. 1 and FIG. 2, the vehicle lower structure according to the embodiment includes front side members 10, rear side members 20, a rear cross member 30, a rear suspension member 40, a battery pack 50, and brackets 60. In FIG. 1 and FIG. 2, a floor panel 70 (see FIG. 6) forming a floor surface of a vehicle cabin is not shown.

The vehicle lower structure in this embodiment is provided with framework members that maintain the rigidity of the vehicle. Specifically, the pair of front side members 10, 10 and the pair of rear side members 20, 20 are provided as the framework members. Further, a pair of rockers 71, 71 is provided farther on an outer side in the vehicle width direction than the pair of front side members 10, 10. As shown in FIG. 1 and FIG. 2, all of the framework members extend in the vehicle length direction.

As further framework members, a first cross member 72 and a second cross member 73 are provided so as to connect the pair of rockers 71, 71 to each other. A center floor cross member 74 is provided farther on the rear side of the cross members. In addition, the rear cross member 30 is provided so as to connect the pair of rear side members 20, 20 to each other. As shown in FIG. 1 and FIG. 2, all of the framework members extend in the vehicle width direction.

The front side members 10 are framework members that extend in the vehicle length direction, from a front bumper reinforcement (not shown) at a front end of the vehicle through a dashboard panel 75 to a floor of the vehicle cabin. The front side members 10 are provided as a pair, one on each side of the floor in the vehicle width direction. The pair of front side members 10, 10 extends in parallel to the pair of rockers 71, 71 that extends in the vehicle length direction and is provided on the floor, farther on the outer side in the vehicle width direction than the pair of front side members 10, 10.

Figure 6:
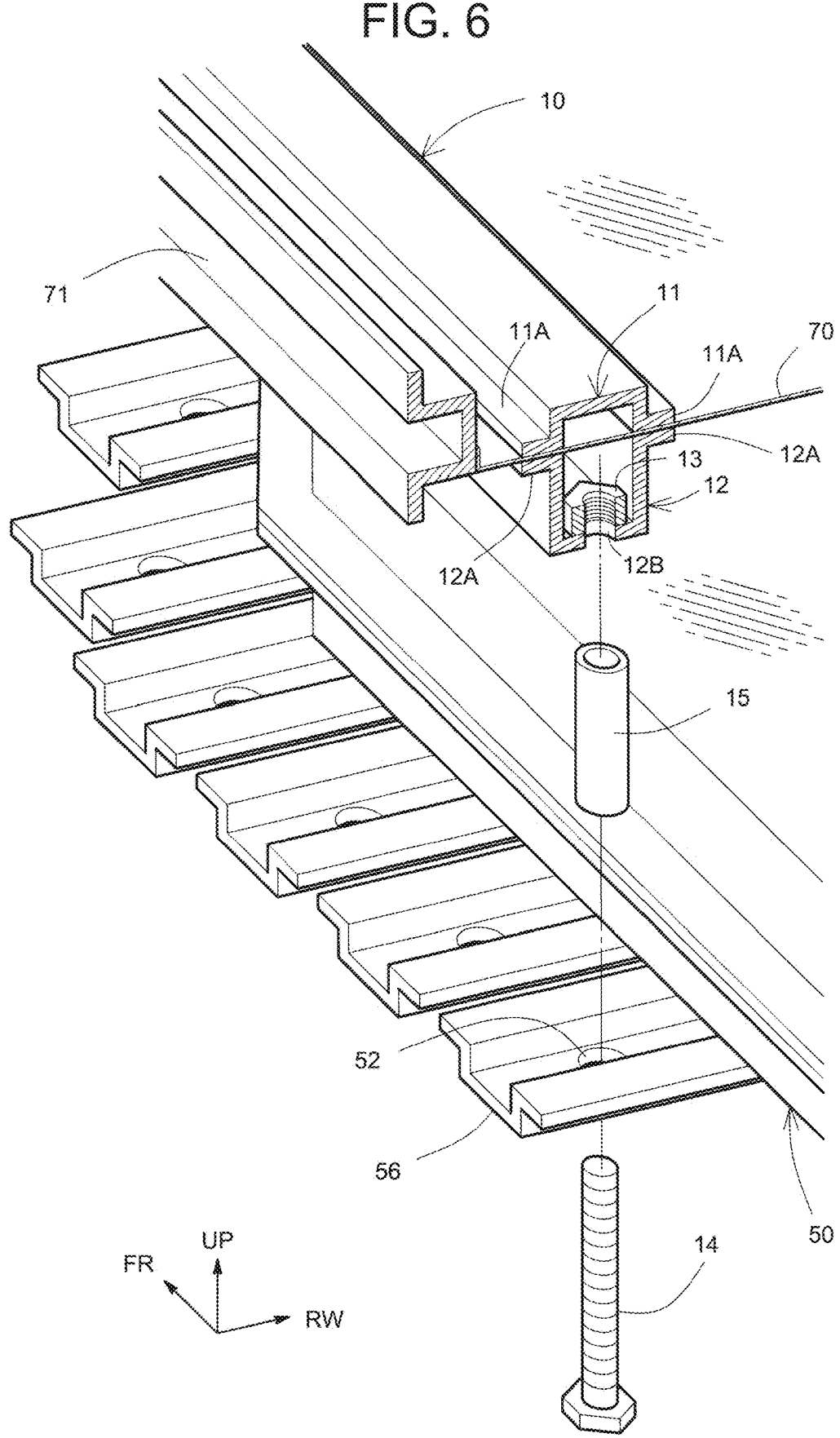
FIG. 6 is an exploded perspective view illustrating a fastening structure on a front side of the battery pack.

As illustrated in FIG. 6, the front side member 10 includes an upper front side member 11 that is disposed on an upper surface of the floor panel 70, and a lower front side member 12 that is disposed on a lower surface of the floor panel 70. The upper front side member 11 and the lower front side member 12 each have a hat shape as seen from a rear side, and are installed one on top of the other with open ends facing each other. Further, flanges 11A, 12A corresponding to brims of the hats are joined together by welding etc. along with the floor panel 70. Thus, a closed cross-sectional structure of the front side member 10 is formed.

An opening 12B is formed in a bottom wall of the lower front side member 12 so as to extend through the bottom wall in a thickness direction thereof (vehicle height direction). Moreover, a weld nut 13 is provided on the bottom wall of the lower front side member 12 such that an axis of the weld nut 13 coincides with a central axis of the opening 12B. As will be described later, the battery pack 50 is hung from and supported by the front side members 10 as a bolt 14 is screwed into the weld nut 13.

Referring to FIG. 1 and FIG. 2, the pair of front side members 10, 10 is connected to the pair of rear side members 20, 20. The rear side members 20 are connected at front ends to rear ends of the front side members 10, and extend in the vehicle length direction up to a rear bumper reinforcement (not shown). Alternatively, a crash box (not shown) that is an impact absorbing member may be provided between rear ends of the rear side members 20 and the rear bumper reinforcement.

Figure 3:
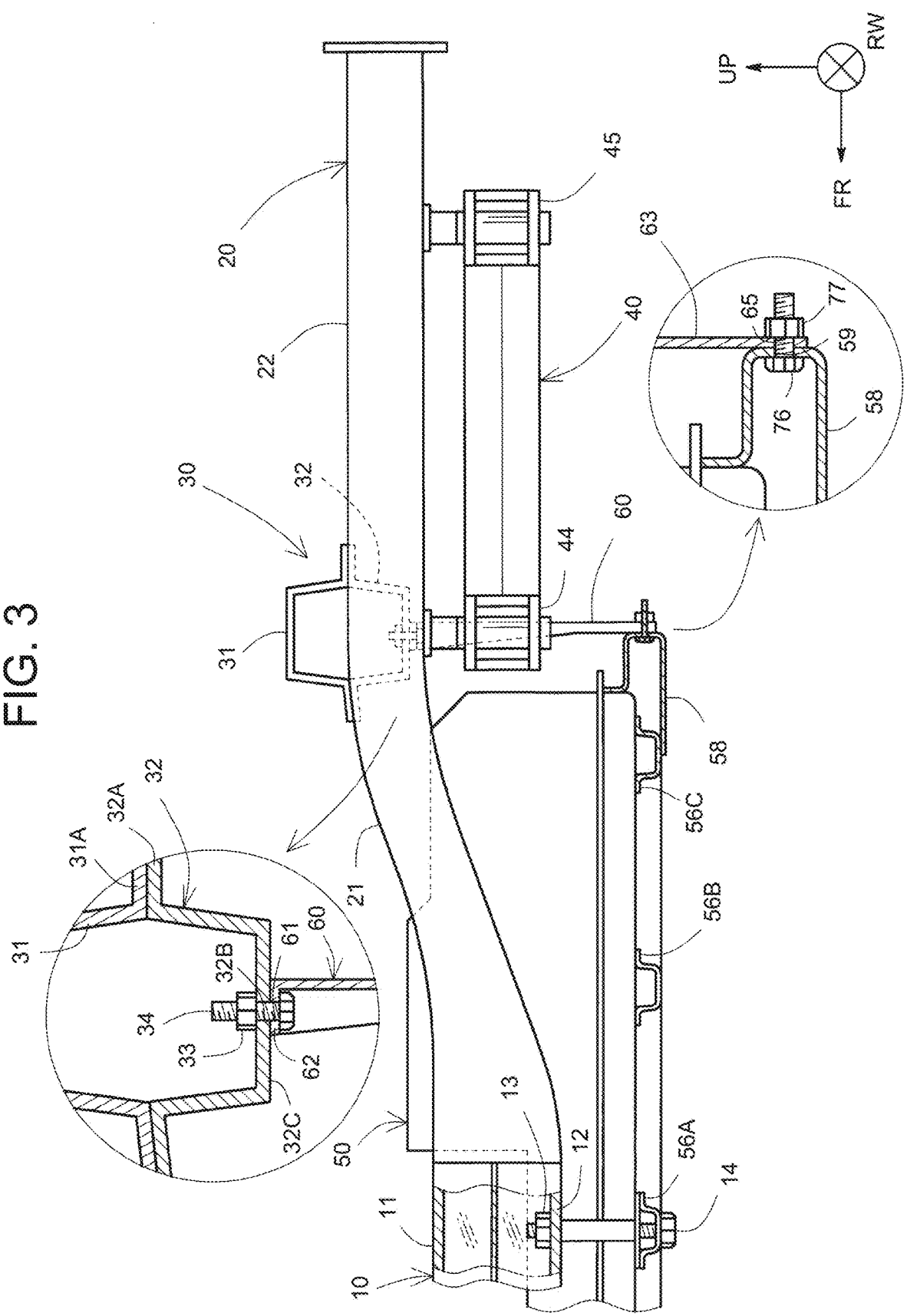
FIG. 3 is a side view taken along line in FIG. 2.

Referring to FIG. 3, the rear side member 20 includes a kick-up part 21 on the front side in the vehicle length direction. The kick-up part 21 is bent toward an upper rear side so as to draw a curve. A linear part 22 extending in the vehicle length direction is connected on the rear side of the kick-up part 21. As the rear side members 20 are thus bent upward (kicked up), a space to dispose the rear suspension member 40 and an axle (not shown) is secured under the linear parts 22 of the rear side members 20.

Referring to FIG. 2, the kick-up part 21 is bent not only toward the upper rear side but also toward an inner side in the vehicle width direction. Thus, a space to dispose rear wheels (not shown) is secured on the outer side of the rear side members 20 in the vehicle width direction.

The rear side member 20 has a hat shape as seen from the rear side, and is disposed with an open end facing upward. As the open end is covered by a rear floor panel (not shown), a closed cross-sectional structure is formed.

The center floor cross member 74 is provided at a border between the front side members 10 and the rear side members 20. The center floor cross member 74 is suspended so as to connect the pair of rockers 71, 71 to each other, and receives a collision load during a lateral collision of the vehicle.

As illustrated in FIG. 2, the center floor cross member 74 is provided so as to face a front surface of the battery pack 50. Thus, the center floor cross member 74 has also a function of stopping the battery pack 50 from moving forward, for example, during a rear-end collision of the vehicle.

The rear cross member 30 is suspended along the vehicle width direction so as to connect the pair of rear side members 20, 20 to each other. The rear cross member 30 connects those parts of the pair of rear side members 20, 20 that are on the rear side from the kick-up parts 21. For example, the rear cross member 30 is provided near ends of bending of the kick-up parts 21.

As illustrated in FIG. 3, the rear cross member 30 includes an upper rear cross member 31 that is an upper member and a lower rear cross member 32 that is a lower member. The upper rear cross member 31 and the lower rear cross member 32 each have a hat shape as seen from a lateral side, and are installed one on top of the other with open ends facing each other. Further, flanges 31A, 32A corresponding to brims of the hats are joined together by welding etc. Thus, a closed cross-sectional structure of the rear cross member 30 is formed.

A member-side fastening hole 32B is formed in a bottom wall 32C of the lower rear cross member 32 so as to extend through the bottom wall 32C in a thickness direction thereof (vehicle height direction). Moreover, a nut 33, such as a weld nut, is provided on the bottom wall 32C of the lower rear cross member 32 such that an axis of the nut 33 coincides with a central axis of the opening of the member-side fastening hole 32B. As will be described later, the bracket 60 is fastened to the rear cross member 30 as a bolt 34 is inserted through the member-side fastening hole 32B and an upper fastening hole 61 of the bracket 60 and further the bolt 34 is screwed into the nut 33.

Referring to FIG. 1, various components are attached to the above-described framework members. For example, the battery pack 50 is hung from and supported by the pair of front side members 10, 10 and the rear cross member 30. The rear suspension member 40 is disposed on the rear side of the battery pack 50 in the vehicle length direction, and is hung from and supported by the rear side members 20.

The rear suspension member 40 is a support member that supports a suspension mechanism (not shown) for the rear wheels, and has rigidity equivalent to that of framework members, for example, the rear side members 20.

The rear suspension member 40 substantially has a double cross shape, i.e., the shape of the pound sign (#), and includes a front cross member 41 extending in the vehicle width direction and a rear cross member 42 provided on the rear side of the front cross member 41 and extending in the vehicle width direction. The rear suspension member 40 further has a pair of side rails 43, 43 that extends in the vehicle length direction so as to connect both ends in the vehicle width direction of the front cross member 41 and those of the rear cross member 42 to each other.

Body mounts to be fastened to the rear side members 20 extend from four corners of the rectangular shape formed by the front cross member 41, the rear cross member 42, and the side rails 43, 43. Specifically, front body mounts 44, 44 extend from positions at which both ends of the front cross member 41 in the vehicle width direction and front ends of the side rails 43, 43 intersect with each other. Rear body mounts 45, 45 extend from positions at which both ends of the rear cross member 42 in the vehicle width direction and rear ends of the side rails 43, 43 intersect with each other.

The rear body mounts 45, 45 extend toward the vehicle rear side while being oriented toward the outer side in the vehicle width direction. Leading ends (rear ends) of the rear body mounts 45, 45 are positioned under the rear side members 20, 20 and fastened by fastening means (not shown).

Figure 7:
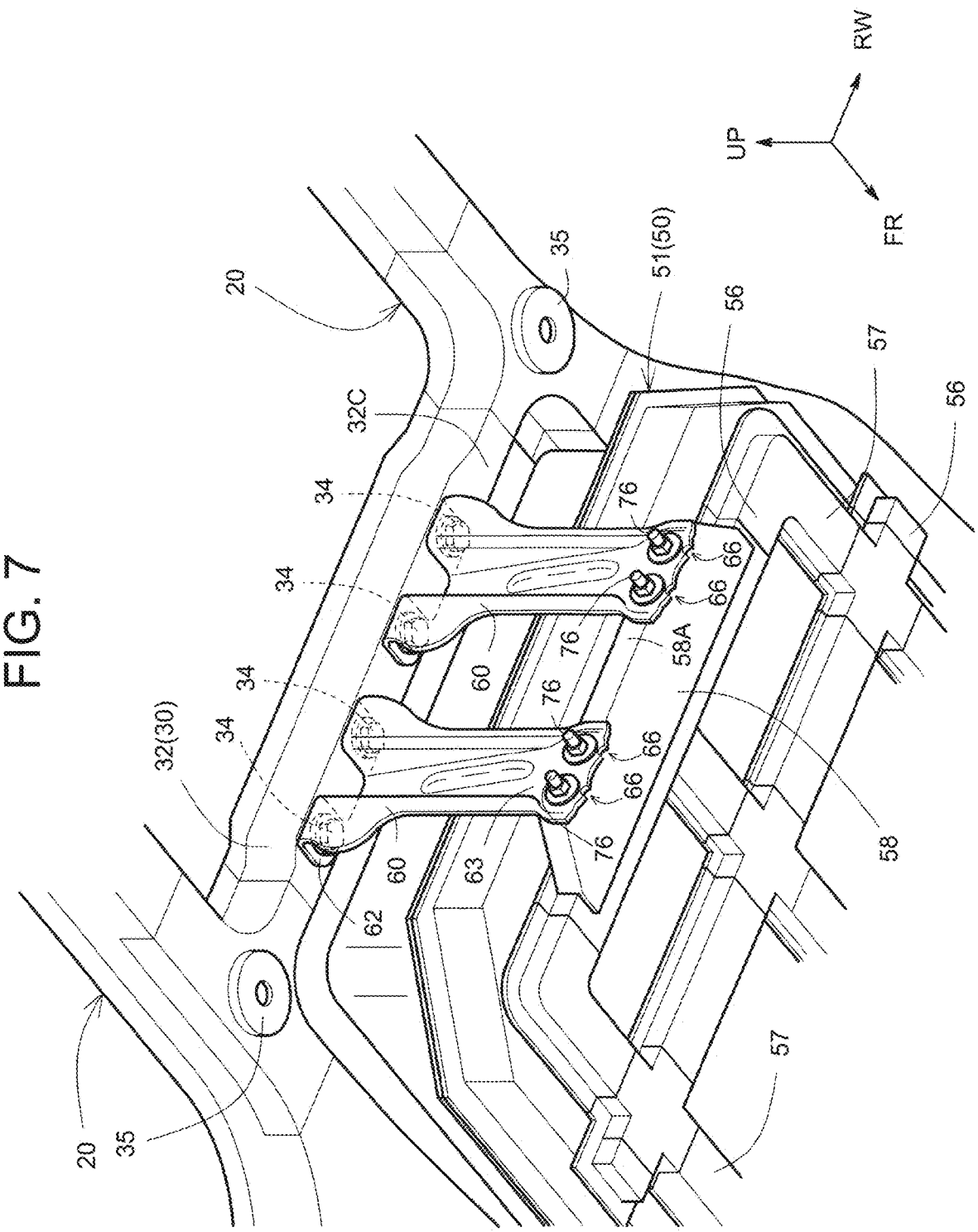
FIG. 7 is an assembled perspective view illustrating a fastening structure on a rear side of the battery pack (without a rear suspension member)
Figure 8:
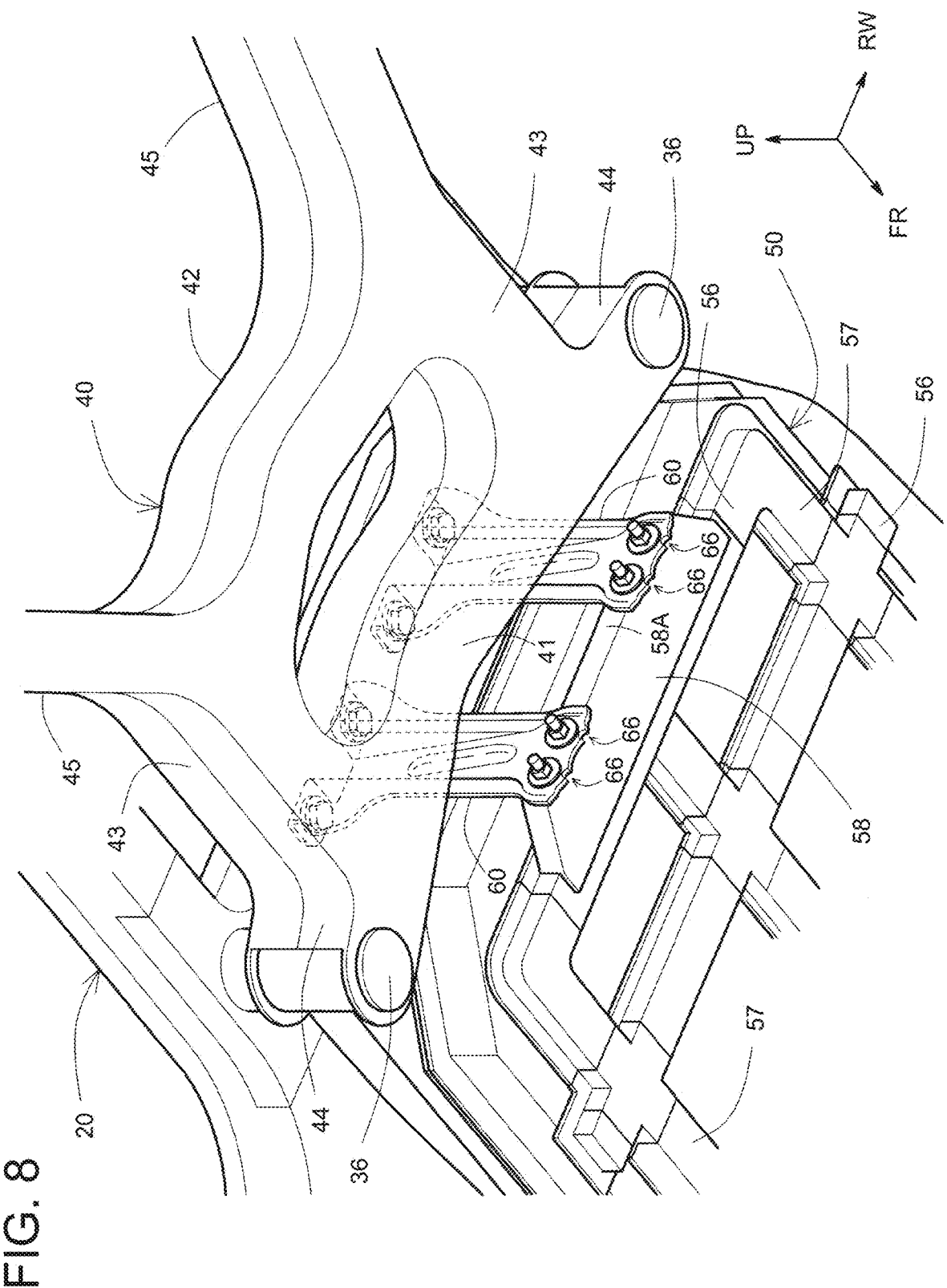
FIG. 8 is an assembled perspective view illustrating the fastening structure on the rear side of the battery pack (with the rear suspension member)

The front body mounts 44, 44 extend toward the vehicle front side while being oriented toward the outer side in the vehicle width direction. As shown in FIG. 7 and FIG. 8, leading ends (front ends) of the front body mounts 44, 44 are positioned with fastening portions 35, 35 that are provided at points in the rear side members 20, 20 at which the rear side members 20, 20 intersect with the rear cross member 30, and the leading ends are fastened by fastening members 36, 36.

As illustrated in FIG. 7, the fastening portions 35, 35 of the rear side members 20, 20 at which the rear side members 20, 20 are fastened to the front body mounts 44, 44 are disposed side by side with the rear cross member 30, i.e., on the same straight line as the rear cross member 30 in the RW-axis direction. Thus, when the brackets 60, 60 are fastened to the rear cross member 30 and the rear suspension member 40 is fastened to the rear side members 20, 20, a rear end of the battery pack 50 and a front surface of the front cross member 41 of the rear suspension member 40 are located close to each other as illustrated in FIG. 3 and FIG. 8.

Referring to FIG. 1, the battery pack 50 is installed under the floor. As will be described below, the battery pack 50 is hung from and supported by the pair of front side members 10, 10. Moreover, the battery pack 50 is hung from and supported by the pair of rear side members 20, 20 through the rear cross member 30.

The battery pack 50 is formed in a size almost as large as the entire surface of the floor as seen from above. Specifically, in the vehicle length direction, the battery pack 50 extends from the dashboard panel 75 that is a front wall of the vehicle cabin to the rear cross member 30 located under a rear seat. In the vehicle width direction, the battery pack 50 has a dimension slightly shorter than an interval between the pair of front side members 10, 10 in the vehicle width direction.

Figure 5:
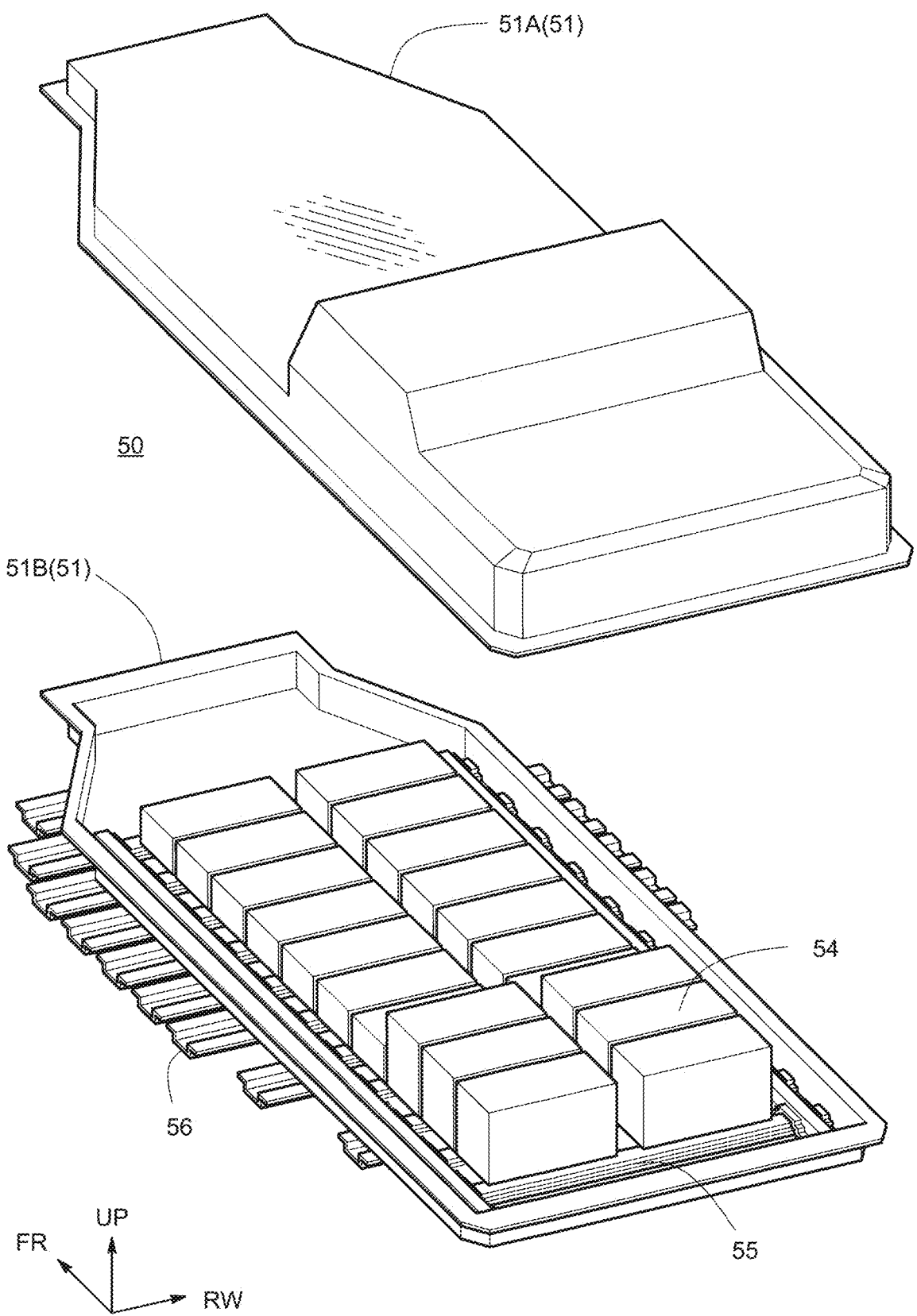
FIG. 5 is an exploded perspective view describing an inside of a battery pack.

FIG. 5 illustrates an exploded perspective view of the battery pack 50. The battery pack 50 includes a case 51 (a case cover 51A and a case tray 51B), battery stacks 54, in-pack cross members 55, and out-pack cross members 56.

A plurality of battery stacks 54 is housed inside the case 51. Each battery stack 54 is a stack of a plurality of battery cells (not shown). The battery cell is formed, for example, by a nickel-metal hydride secondary battery, a lithium-ion secondary battery, or an all-solid battery.

The case 51 is a casing that houses the battery stacks 54, and includes the case cover 51A that is an upper member and the case tray 51B that is a lower member. Both the case cover 51A and the case tray 51B are formed by a metal thin plate material, such as an aluminum panel.

The in-pack cross members 55 are provided on an inner surface (upper surface) of a bottom plate of the case tray 51B along the vehicle length direction. The in-pack cross members 55 are framework members that protect the battery pack 50, and extend in the vehicle width direction across both ends of the bottom plate of the case tray 51B.

The out-pack cross members 56 are provided on an outer surface (lower surface) of the bottom plate of the case tray 51B. The out-pack cross members 56 are framework members that protect the battery pack 50 along with the in-pack cross members 55, and are provided outside the battery pack 50 and extend in the vehicle width direction. To receive an obstacle (barrier) that accesses the battery pack 50 from a lateral side during a lateral collision of the vehicle, before the obstacle reaches the battery pack 50, the out-pack cross members 56 are formed such that both ends in the vehicle width direction project farther outward than both ends of the case 51 in the vehicle width direction.

Referring to FIG. 7, out-pack members 57 extend in the vehicle length direction so as to connect to one another the out-pack cross members 56 extending in the vehicle width direction. Moreover, the out-pack cross member 56 at a most rear end in the vehicle length direction is provided with an extension 58 that is an extension member protruding farther rearward than a rear end of the case 51. Thus, a rear end wall 58A of the extension 58 forms the rear end of the battery pack 50. As shown in FIG. 7, the brackets 60 are fastened to the extension 58.

Referring to FIG. 6, an opening 52 is provided at each end of the out-pack cross member 56 in the vehicle width direction so as to extend through the out-pack cross member 56 in the vehicle height direction. The bolt 14 is inserted through the opening 52. The bolt 14 is inserted also through a collar 15 and the opening 12B of the lower front side member 12. Moreover, the bolt 14 is screwed into the weld nut 13 provided on the lower front side member 12. Thus, the out-pack cross member 56 is fastened to the front side member 10.

FIG. 3 shows three out-pack cross members 56A, 56B, 56C along the vehicle length direction. Of the out-pack cross members 56A, 56B, 56C, only the out-pack cross member 56A provided directly under the front side members 10 is fastened with the bolts. On the rear side from the out-pack cross member 56A, the battery pack 50 is hung from and supported by the rear cross member 30 through the brackets 60. This means that the battery pack 50 is hung from and supported by those parts of the rear side members 20 that are on the rear side from the kick-up parts 21, by means of only the brackets 60. That is, the brackets 60 are the only means by which the battery pack is hung from the parts of the rear side members 20, in a region rearward from the kick-up parts 21 in the vehicle length direction.

As will be described later, the parts on the rear side from the kick-up parts 21 are bent upward during a rear-end collision of the vehicle. When the battery pack 50 is thus supported by those bent parts by means of only the brackets 60, simply causing the brackets 60 to fracture can prevent the battery pack 50 from being pulled up as the parts on the rear side from the kick-up parts 21 are bent during a rear-end collision.

Figure 9:
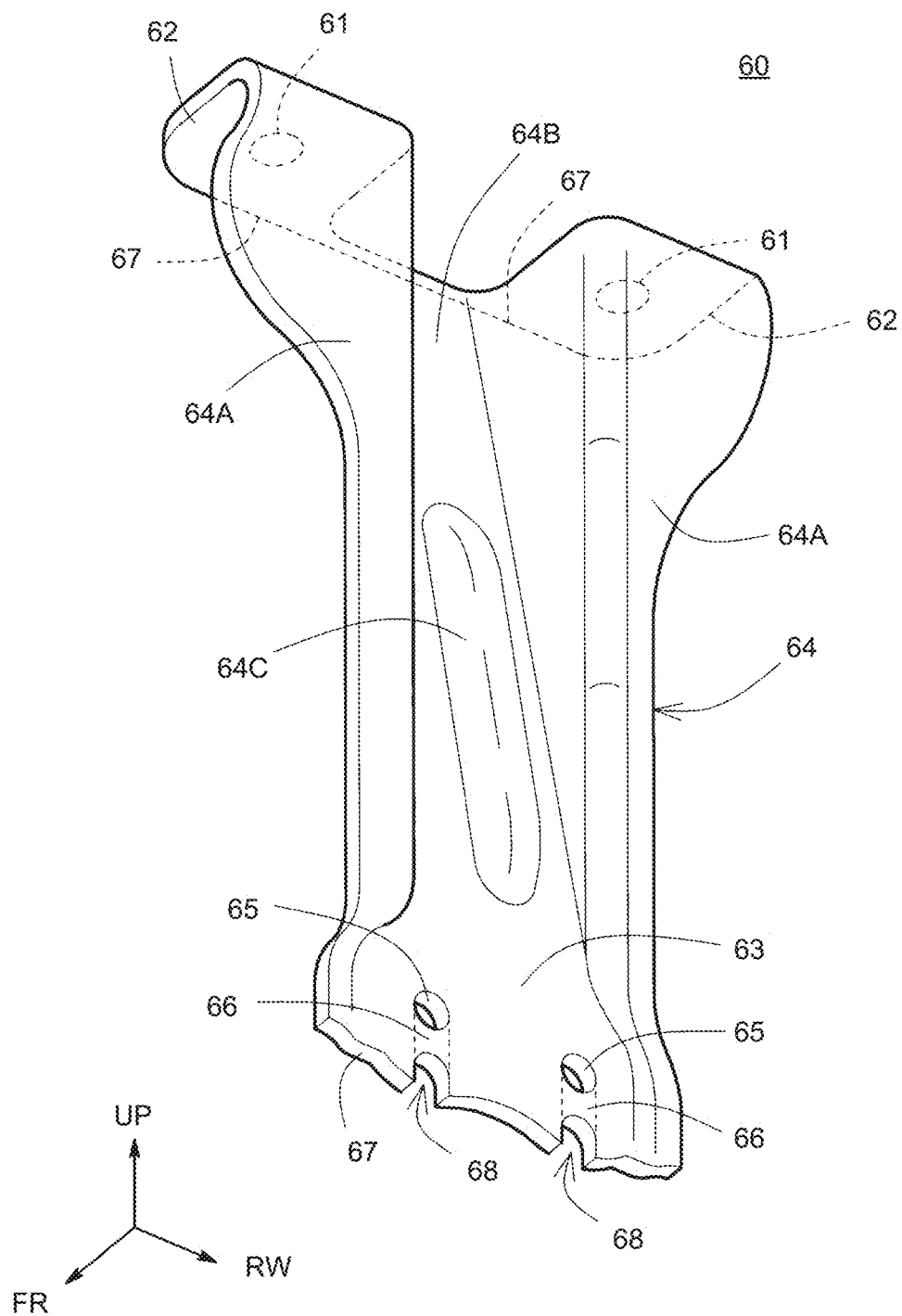
FIG. 9 is a perspective view illustrating a bracket according to the embodiment.

FIG. 9 illustrates a perspective view of the bracket 60 as a single component. The bracket 60 is a fastening member that connects the extension 58 that forms the rear end of the battery pack 50 and the lower rear cross member 32 to each other. The bracket 60 extends substantially in the vehicle height direction according to an interval between the extension 58 and the lower rear cross member 32.

The bracket 60 includes a pair of upper flanges 62, 62, a lower flange 63, and a coupling part 64 that connects the upper flanges 62 and the lower flange 63 to each other. The upper flanges 62 are placed against the bottom wall 32C (see FIG. 7) of the lower rear cross member 32. Therefore, the upper flange 62 has a shape conforming to the bottom wall 32C of the lower rear cross member 32, and extends in a direction (horizontal direction) substantially orthogonal to an extension direction (vertical direction) of the coupling part 64.

The upper fastening hole 61 is provided in the upper flange 62 so as to extend through the upper flange 62 in the vehicle height direction. The bolt 34 that is a fastening member for fastening together the lower rear cross member 32 and the upper flange 62 is inserted through the upper fastening hole 61.

For example, as illustrated in FIG. 3, the upper fastening hole 61 of the upper flange 62 and the member-side fastening hole 32B of the lower rear cross member 32 are positioned with each other, and the bolt 34 is inserted through both holes. Moreover, the bolt 34 is screwed into the nut 33 provided on the bottom wall 32C of the lower rear cross member 32. Thus, the upper flange 62 and the lower rear cross member 32 are fastened together.

To reinforce front ends and rear ends of the upper flanges 62 in the vehicle length direction (FR-axis direction), the coupling part 64 has a pair of vertical portions 64A, 64A that extends linearly from the lower flange 63 and is connected to the rear ends of the pair of upper flanges 62, 62. The coupling part 64 further includes an inclined portion 64B that is provided between the pair of vertical portions 64A, 64A and inclined toward the front ends of the upper flanges 62 relative to the vertical portions 64A. A reinforcing bead 64C may be provided on the inclined portion 64B.

The lower flange 63 is placed against the rear end wall 58A (see FIG. 7) of the extension 58 that is provided on the lower side, and at the rear end, of the battery pack 50. Lower fastening holes 65 are provided in the lower flange 63 so as to extend through the lower flange 63 in the vehicle length direction. A bolt 76 that is a fastening member for fastening together the lower flange 63 and the extension 58 (the rear end of the battery pack 50) is inserted through the lower fastening hole 65.

As illustrated in FIG. 3, the lower fastening hole 65 of the lower flange 63 and a pack-side fastening hole 59 of the extension 58 are positioned with each other, and the bolt 76 is inserted through both holes. Moreover, the bolt 76 is screwed into a nut 77 on the lower flange 63, and thereby the lower flange 63 and the battery pack 50 are fastened together. Alternatively, the bolt 76 may be a weld bolt, and the bolt 76 may be welded in a state of being inserted through the pack-side fastening hole 59 in advance.

As the upper flanges 62 are fastened to the lower rear cross member 32 and the lower flange 63 is fastened to the battery pack 50, the battery pack 50 is hung from and supported by the rear side members 20 through the brackets 60 and the rear cross member 30.

Figure 4:
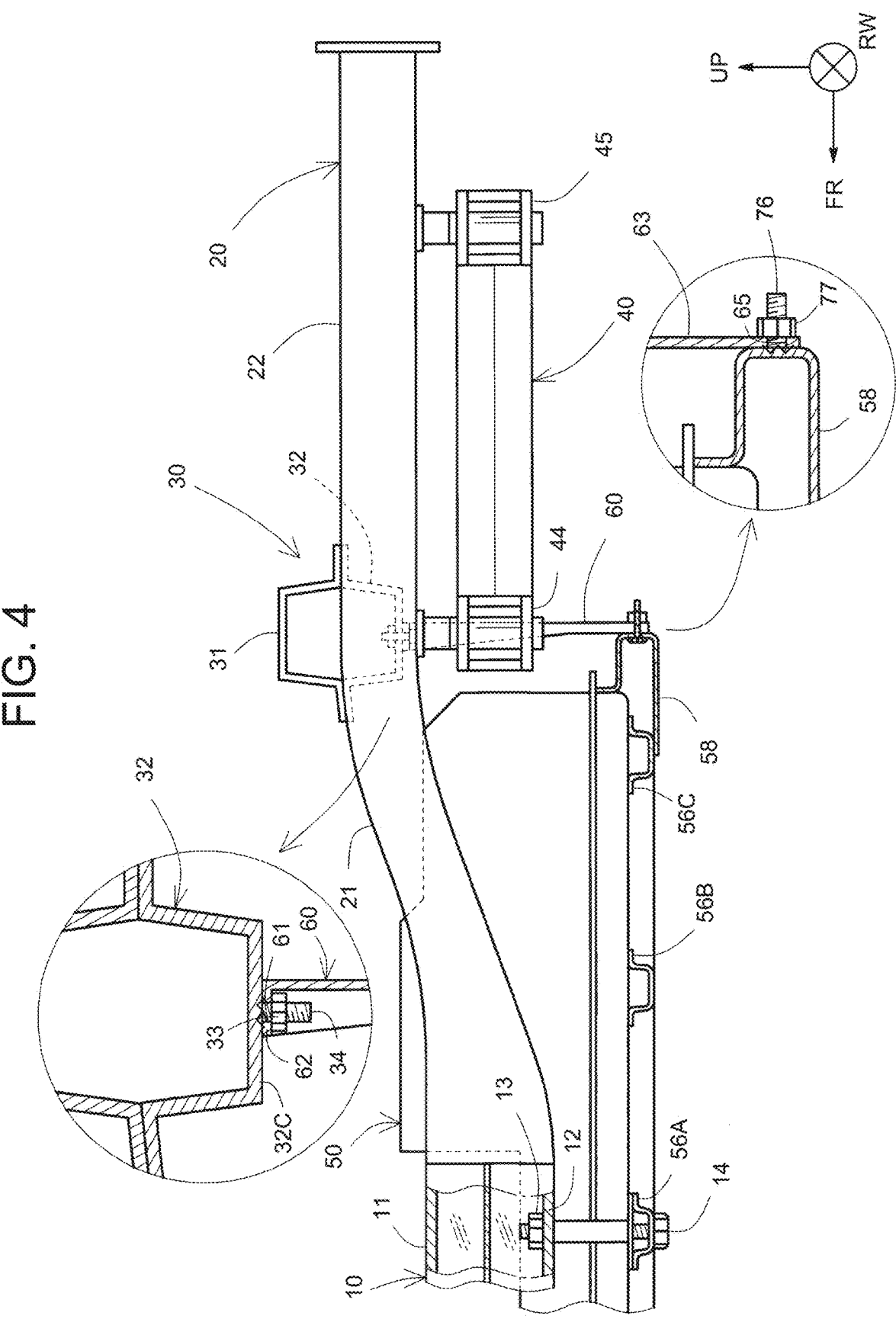
FIG. 4 is a view showing another example of FIG. 3.

While the example in which the pack-side fastening hole 59 is provided in the extension 58 of the battery pack 50 and the member-side fastening hole 32B is provided in the lower rear cross member 32 is shown in FIG. 3, the present disclosure is not limited to this form. For example, as illustrated in FIG. 4, the bolt 76 may be welded to the rear end wall of the extension 58, and the bolt 76 may be inserted through the lower fastening hole 65 of the lower flange 63 in this state. Similarly, the bolt 34 may be welded to a lower surface of the bottom wall 32C of the lower rear cross member 32, and the bolt 34 may be inserted through the upper fastening hole 61 of the upper flange 62 in this state.

Referring back to FIG. 9, the lower flange 63 includes fragile portions 66. The fragile portion 66 refers to a portion of the lower flange 63 at which the lower flange 63 has relatively low load-bearing property (fractures easily). The fragile portion 66 is formed between an end edge 67 of the lower flange 63 and the lower fastening hole 65. For example, the fragile portion 66 is formed by providing a notch 68 by notching a portion of the end edge 67.

For example, the fragile portion 66 is provided on the lower side from the lower fastening hole 65, as seen in an erected state of the bracket 60, i.e., in a state where the bracket 60 is fastened to the lower rear cross member 32 and the extension 58. As will be described later, during a rear-end collision of the vehicle, an upward tensile load is input into the bracket 60, and as a stress in response to this tensile load, a downward load is input from the bolt 76 into a portion of the lower flange 63 on the lower side from the lower fastening hole 65. When the fragile portion 66 is provided on a path along which the load is input, the fragile portion 66 fractures (the lower fastening hole 65 is exposed) without delay during a rear-end collision.

Behavior During Rear-End Collision

Figure 10:
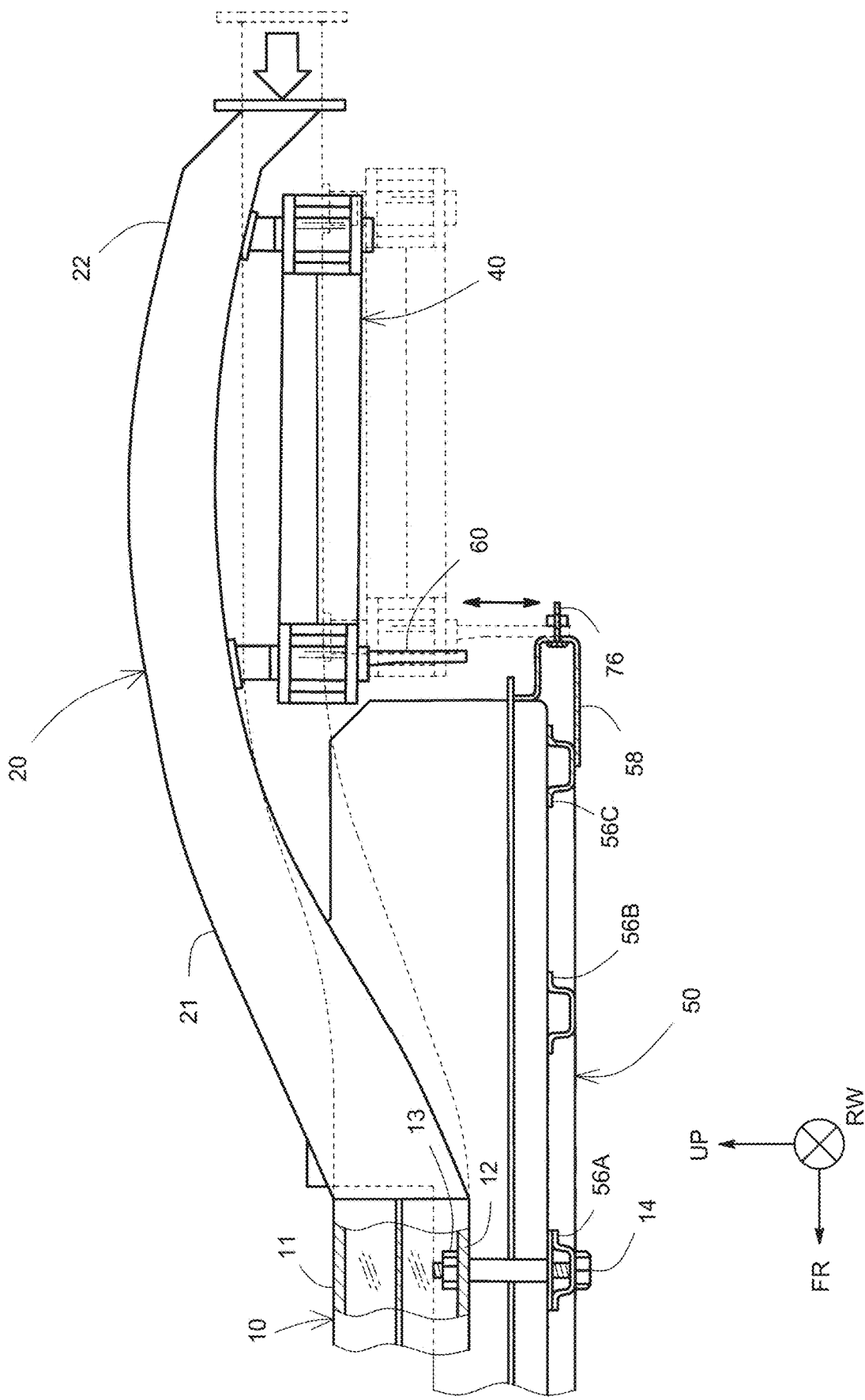
FIG. 10 is a side view describing the behavior of the vehicle lower structure during a rear-end collision of a vehicle.
Figure 11:
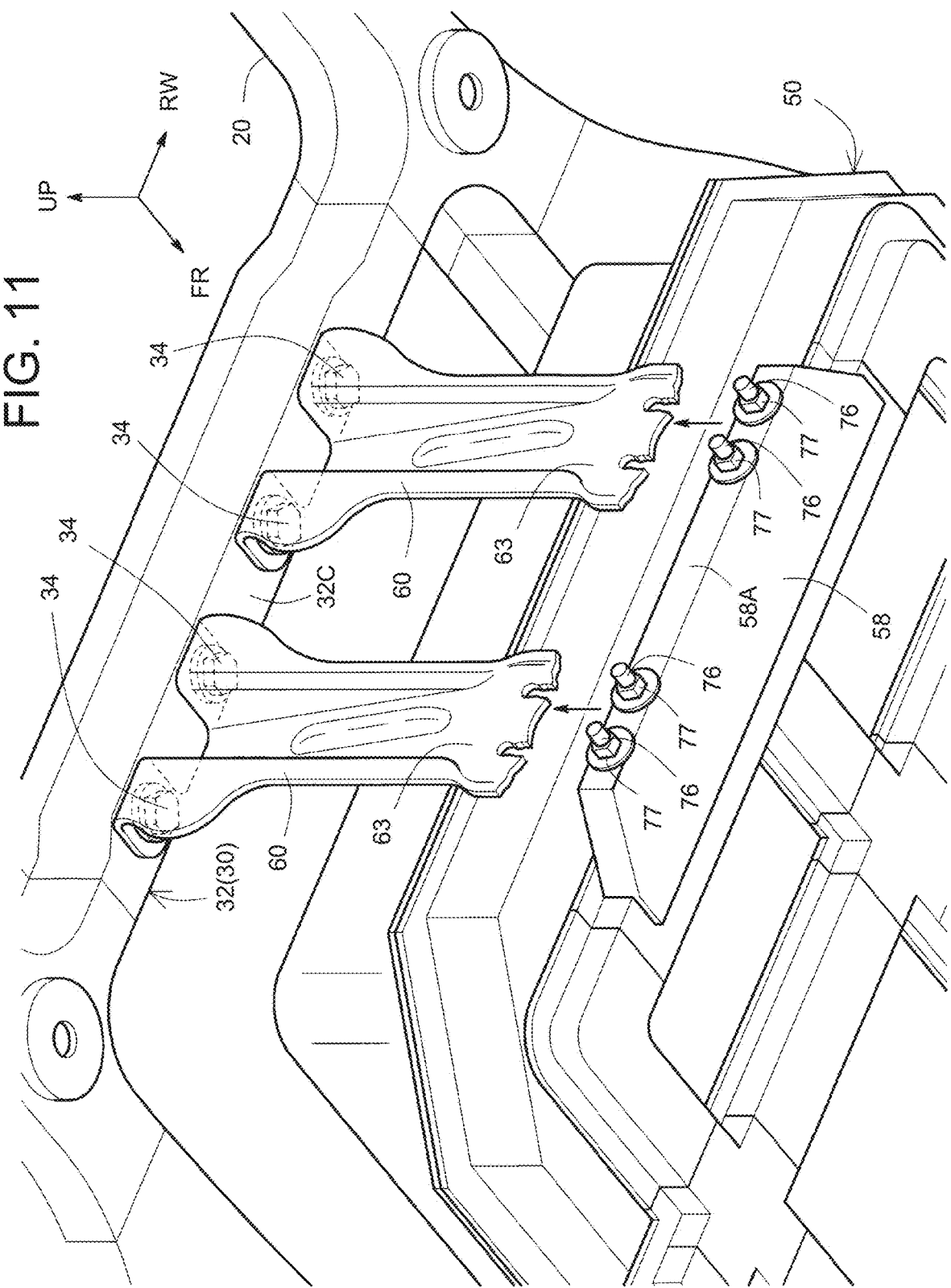
FIG. 11 is a perspective view describing the behavior of the vehicle lower structure during a rear-end collision of the vehicle.

Referring to FIG. 10 and FIG. 11, the behavior of the vehicle lower structure according to the embodiment during a rear-end collision of the vehicle will be described. During a rear-end collision of the vehicle, an impact load is input into the rear side members 20 that are framework members. In this case, due to the bent structure of the kick-up parts 21, those parts of the rear side members 20 that are on the rear side from the kick-up parts 21 are deformed upward such that the bent kick-up parts 21 are further bent.

As the parts on the rear side from the kick-up parts 21 are further bent, members that are hung from and supported by those parts come closer to each other. Specifically, the rear end of the battery pack 50 and the front end of the rear suspension member 40 come closer to each other.

As the parts on the rear side from the kick-up parts 21 are further deformed upward, the member hung from and supported by those parts are pulled up. Here, the battery pack 50 is not only hung from and supported by the rear side members 20 by means of the brackets 60 (through the rear cross member 30) but also hung from and supported by the front side members 10 through the out-pack cross member 56. Therefore, a front part of the battery pack 50 tries to maintain the position thereof in the vehicle height direction while a rear part of the battery pack 50 is urged upward as the kick-up parts 21 are bent.

Accordingly, an upward tensile load is input into the brackets 60 fastened to the rear end of the battery pack 50 and the rear cross member 30 that is rising. In response to this tensile load, a shear stress is generated in the bolt 76 inserted through the lower fastening hole 65 of the bracket 60, so that a downward load is input into the portion of the lower flange 63 of the bracket 60 on the lower side from the lower fastening hole 65.

The fragile portion 66 is formed at this portion on the lower side from the lower fastening hole 65 into which the load is input, and when the load is input, the fragile portion 66 fractures such that the lower fastening hole 65 and the end edge 67 of the lower flange 63 communicate with each other as illustrated in FIG. 11. As a result, the bracket 60 is disengaged upward from the bolt 76, and the bracket 60 and the battery pack 50 are unfastened from each other.

As the bracket 60 and the battery pack 50 are unfastened from each other, pulling up of the battery pack 50 is avoided. Meanwhile, the rear suspension member 40 that remains hung from and supported by the rear side members 20 is shifted toward an upper front side. In this case, the rear suspension member 40 and the battery pack 50 are located at different positions from each other in the up-down direction (the vehicle height direction). Thus, even when the rear suspension member 40 shifts forward, the rear suspension member 40 passes above the battery pack 50 (the rear suspension member 40 and the battery pack 50 pass each other), so that contact between the battery pack 50 and the rear suspension member 40 can be prevented.

Other Examples of Bracket

Figure 12:
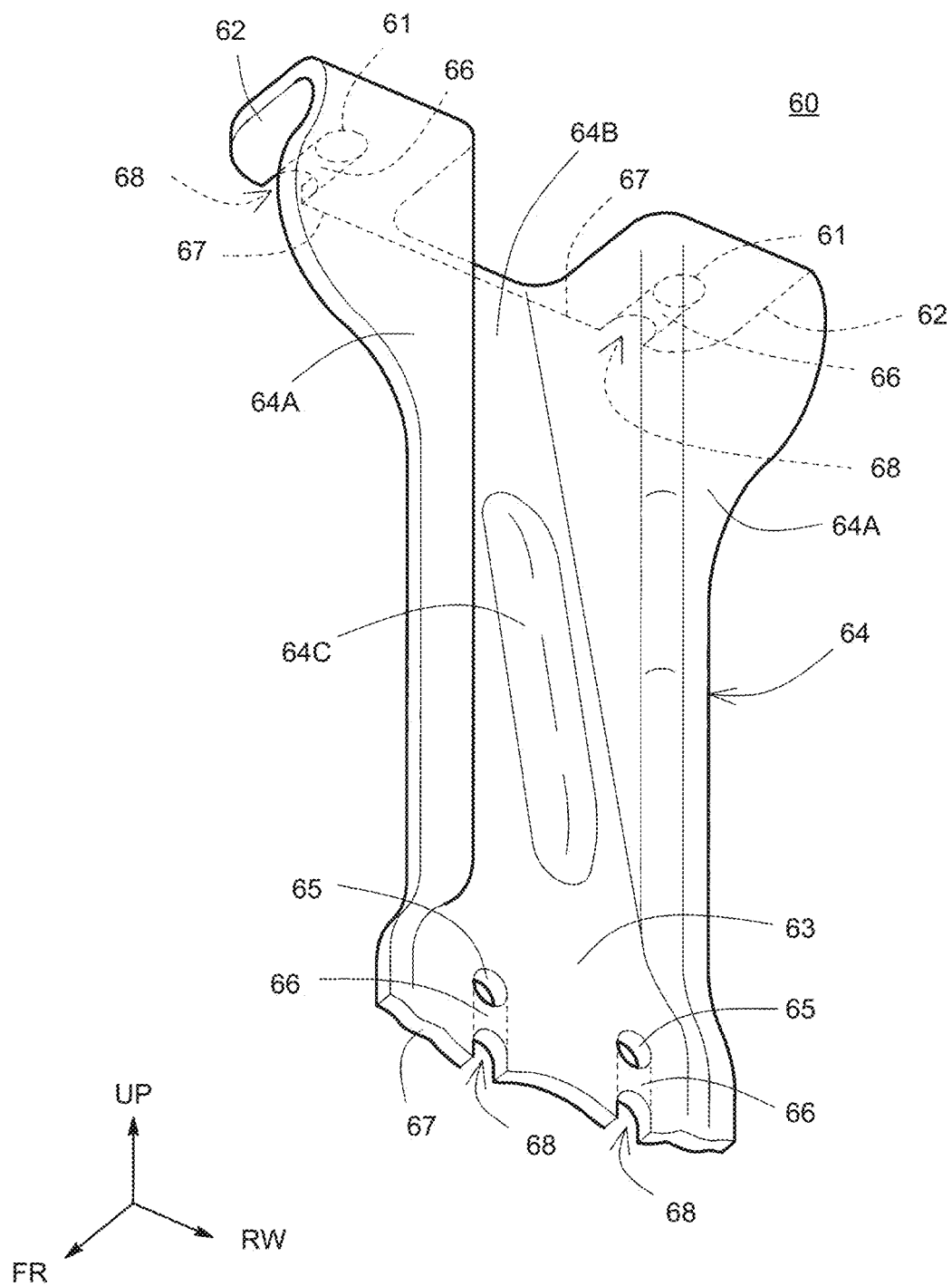
FIG. 12 is a perspective view illustrating a bracket according to another example of the embodiment.

The bracket 60 illustrated in FIG. 1 to FIG. 11 is provided with the fragile portion 66 in the lower flange 63, but the present disclosure is not limited to this form. What is essential is that the fastening hole fractures when a tensile load is input into the bracket 60 in the vehicle height direction during a rear-end collision. Therefore, for example, as shown in FIG. 12, the fragile portion 66 may be formed by providing a notch 68 between the upper fastening hole 61 of the upper flange 62 and an end edge 67 of the upper flange 62. Instead of each of the upper flange 62 and the lower flange 63 being provided with the fragile portion 66, at least one of the flanges may be provided with the fragile portion 66 between the fastening hole and the end edge of the flange.

Here, as described above, when the fragile portion 66 is provided on the lower side of the lower fastening hole 65 of the lower flange 63, this means that the fragile portion 66 is provided on the path along which a load generated during a rear-end collision is input, which has an advantage that the fragile portion 66 fractures with high responsiveness in the event of a rear-end collision.

Figure 13:
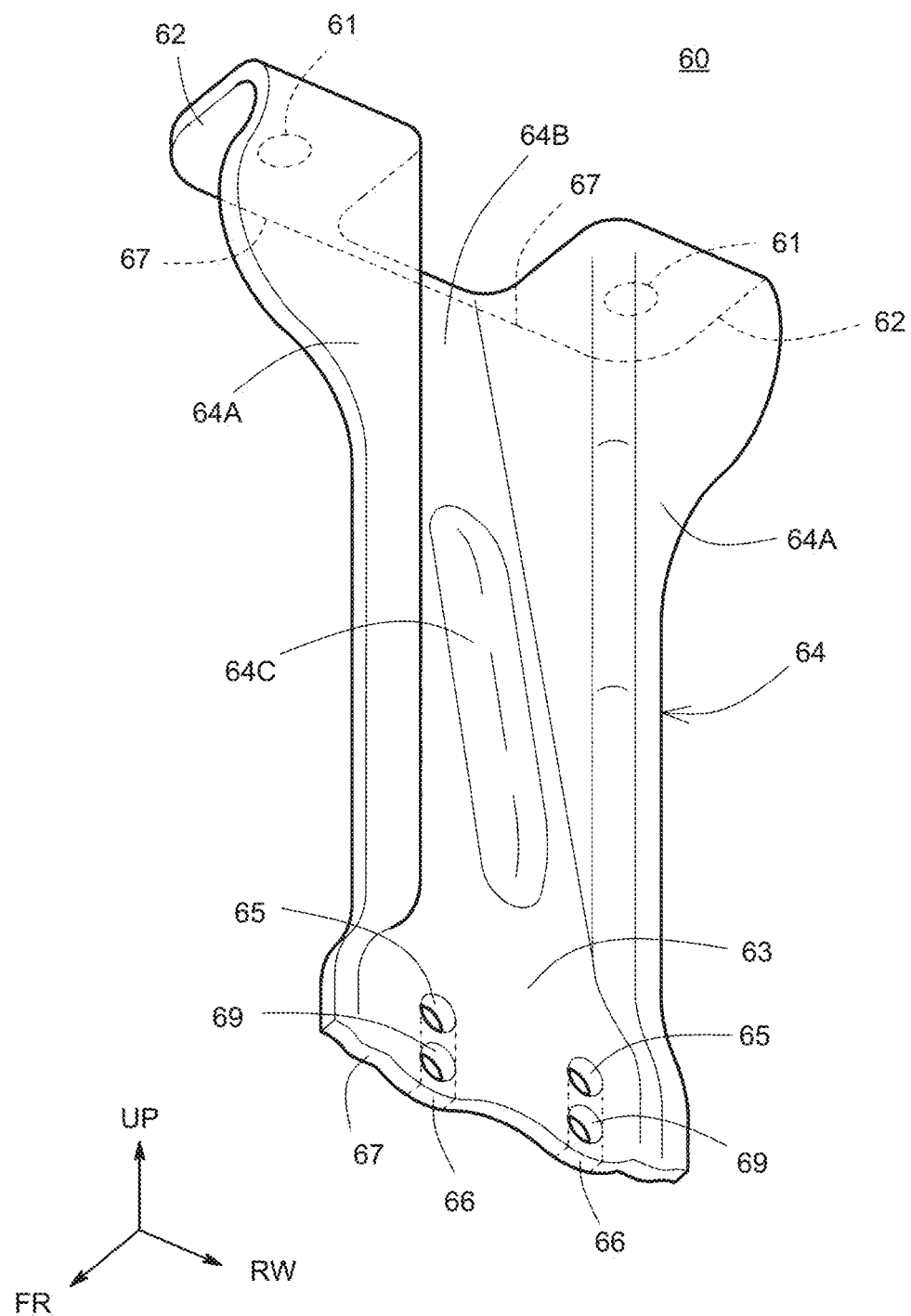
FIG. 13 is a perspective view illustrating a bracket according to yet another example of the embodiment.

While the fragile portion 66 is formed by notching the end edge of the flange in FIG. 9 and FIG. 12, the present disclosure is not limited to this form. For example, as illustrated in FIG. 13, the fragile portion 66 may be formed by providing a dummy hole 69 as a fragile portion, separately from the fastening hole (lower fastening hole 65) through which the bolt that is a fastening member is inserted. As with the notch 68, the dummy hole 69 can be provided at least either between the upper fastening hole 61 and the end edge 67 of the upper flange 62 or between the lower fastening hole 65 and the end edge 67 of the lower flange 63.

What is claimed is:

1. A vehicle lower structure comprising:
a pair of front side members provided one on each side of a floor in a vehicle width direction and extending in a vehicle length direction;
a pair of rear side members, each of the rear side members being connected at a front end of the rear side member to a rear end of corresponding one of the pair of front side members and having a kick-up part bent toward an upper rear side of a vehicle;
a rear cross member that extends in the vehicle width direction so as to connect a part of one of the pair of rear side members on a rear side from a kick-up part of the one of the pair of rear side members and a part of the other one of the pair of rear side members on a rear side from a kick-up part of the other one of the pair of rear side members;
a battery pack that is installed under the floor, is hung from the pair of front side members and is hung from the pair of the rear side members through the rear cross member; and a bracket including
- a lower flange that is placed against a rear end of the battery pack, and has a lower fastening hole through which a first fastening member to be fastened to the rear end of the battery pack is inserted and
- an upper flange that is placed against the rear cross member, and has an upper fastening hole through which a second fastening member to be fastened to the rear cross member is inserted, wherein the bracket has a fragile portion at least either between the upper fastening hole and an end edge of the upper flange or between the lower fastening hole and an end edge of the lower flange.

2. The vehicle lower structure according to claim 1, wherein
the fragile portion of the lower flange is provided on a lower side from the lower fastening hole.

3. The vehicle lower structure according to claim 1, wherein
the battery pack is hung from the part of one of the pair of rear side members on the rear side from the kick-up part of the one of the pair of rear side members and the part of the other one of the pair of rear side members on the rear side from the kick-up part of the other one of the pair of rear side members, by only the bracket.

4. The vehicle lower structure according to claim 1, wherein
the fragile portion has a lower load-bearing property than parts of the bracket other than the fragile portion.

\* \* \* \* \*